(12) United States Patent
Matsuzawa et al.

(10) Patent No.: US 8,902,540 B2
(45) Date of Patent: Dec. 2, 2014

(54) DISK STORAGE APPARATUS AND METHOD FOR SERVO CONTROLLING

(71) Applicant: Kabushiki Kaisha Toshiba, Minato-ku, Tokyo (JP)

(72) Inventors: Takuji Matsuzawa, Kashiwa (JP); Takeyori Hara, Kawasaki (JP); Makoto Asakura, Tokyo (JP); Takayuki Kawabe, Sagamihara (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/799,946

(22) Filed: Mar. 13, 2013

(65) Prior Publication Data

US 2014/0153131 A1 Jun. 5, 2014

(30) Foreign Application Priority Data

Nov. 30, 2012 (JP) ................................ 2012-262419

(51) Int. Cl.
  *G11B 5/596* (2006.01)
  *G11B 21/08* (2006.01)
  *G11B 5/55* (2006.01)
(52) U.S. Cl.
  CPC ............ *G11B 21/083* (2013.01); *G11B 5/5547* (2013.01)
  USPC ..................................... 360/78.09; 360/78.14
(58) Field of Classification Search
  None
  See application file for complete search history.

(56) References Cited

U.S. PATENT DOCUMENTS

| 6,075,667 | A | * | 6/2000 | Kisaka et al. | ................... 360/49 |
| RE39,831 | E | | 9/2007 | Le et al. | |
| 2003/0035241 | A1 | * | 2/2003 | Gregg | ......................... 360/78.09 |

FOREIGN PATENT DOCUMENTS

| JP | A-H02-304777 | 12/1990 |
| JP | A-2000-163880 | 6/2000 |
| JP | A-2002-056549 | 2/2002 |

* cited by examiner

*Primary Examiner* — Andrew L Sniezek
(74) *Attorney, Agent, or Firm* — Posz Law Group, PLC (57) ABSTRACT

According to one embodiment, a disk storage apparatus includes a servo system. The servo system includes a state observer and performs a seek operation up to a target position with a current position of a head undetermined. The servo system performs the seek operation based on initial values including a temporary position, while allowing the state observer to operate based on the initial values, until the current position is determined. The servo system determines the current position based on the servo data read from the plurality of servo areas by the read module and a result of estimation by the state observer.

14 Claims, 5 Drawing Sheets

FIG. 6A  Target CL  | T4 | T3 | T2 | T1 | T0 |

FIG. 6B  Current CL | X4 | X3 | X2 | X1 | X0 |

FIG. 7A  Current CL-1 | T4 | T3 | T2 | T1 | X0 |

FIG. 7B  Current CL-2 | T4 | T3 | T2 | T1 | T0 | X0 |

DISK STORAGE APPARATUS AND METHOD FOR SERVO CONTROLLING

CROSS-REFERENCE TO RELATED APPLICATIONS

This application is based upon and claims the benefit of priority from Japanese Patent Application No. 2012-262419, filed Nov. 30, 2012, the entire contents of which are incorporated herein by reference.

FIELD

Embodiments described herein relate generally to a disk storage apparatus and a method for servo controlling.

BACKGROUND

In the field of disk storage apparatuses such as hard disk drives (hereinafter simply referred to as disk drives), much effort has recently been made to increase the recording density of disks as storage media. In a disk drive, servo areas (also referred to as servo frames) in which servo data is recorded are arranged on a disk at regular intervals in a circumferential direction. The servo data is position data used to detect the position of a head on the disk. The servo data includes a cylinder number (track number) which identifies the position of a cylinder (track) and a sector number which identifies a sector in the cylinder.

A servo data division method has been proposed in which, for the increased recording density of disks, cylinder codes forming a cylinder number identifying one cylinder are recorded in a plurality of servo areas in the cylinder in a divisional manner. A method has also been proposed in which the sector number is similarly recorded in a plurality of servo areas in a divisional manner. This enables a reduction in the size of each servo area and thus an increase in the size of data areas in which user data is recorded for each cylinder.

According to the servo data division method, during a seek operation without head switching or a normal reproduction (tracking) operation, the current position of the head can be detected by reading the each portions of the cylinder number from the respective plurality of servo areas within the same cylinder and reconfiguring these portions. However, during a seek operation with head switching or a load operation for loading the head from a retracted position onto the disk, the initial position of the head is unknown and an estimated position provided by a state observer is unreliable. This precludes the current position of the head from being accurately detected during a seek operation.

DETAILED DESCRIPTION

In general, according to one embodiment, a disk storage apparatus includes a disk, a read module, and a servo system. The disk includes a plurality of servo areas in which servo data detecting a radial position is recorded in a divisional manner. The read module uses a head to read the servo data from the plurality of servo areas. The servo system includes a state observer and performs a seek operation up to a target position is performed while a current position of the head is undetermined. In performing a seek operation, the servo system performs the seek operation based on initial values including a temporary position, while allowing the state observer to operate based on the initial values, until the current position is determined. The servo system determines the current position based on the servo data read from the plurality of servo areas by the read module and a result of estimation by the state observer, and performs the seek operation up to the target position based on the determined current position.

Various embodiments will be described hereinafter with reference to the accompanying drawings.

[Disk Drive Configuration]

Figure 1:
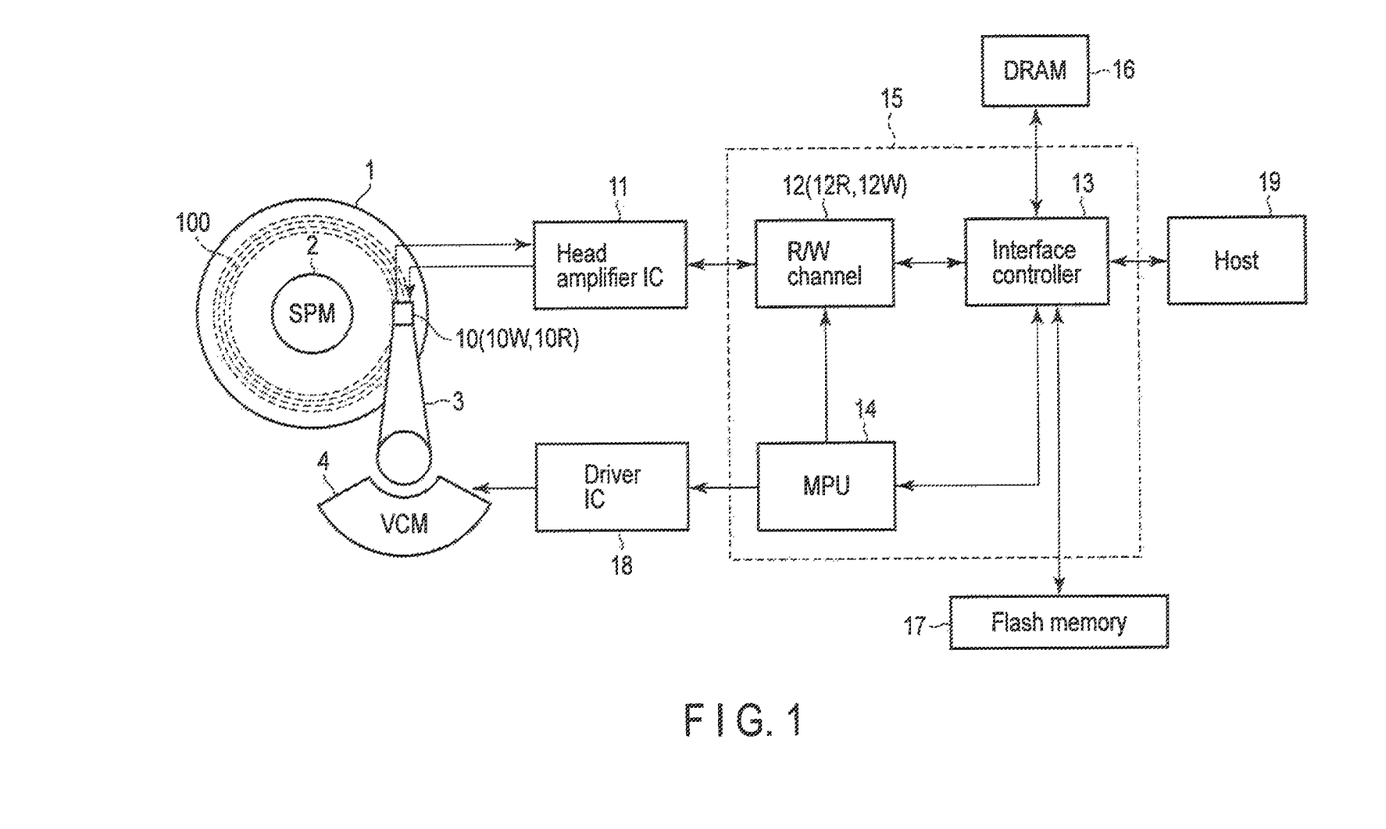
FIG. 1 is a block diagram for explaining a configuration of a disk drive according to an embodiment.

FIG. 1 is a block diagram showing an essential part of a disk drive according to the present embodiment.

As shown in FIG. 1, the disk drive generally comprises a head-disk assembly (HDA), a head amplifier integrated circuit (hereinafter referred to as a head amplifier IC) 11, a hard disk controller (HDC) 15, and a driver IC 18.

The HDA comprises a disk 1 which is a storage medium, a spindle motor (SPM) 2, an arm 3 with a head 10 mounted thereon, and a voice coil motor (VCM) 4. The disk 1 is rotated by the spindle motor 2. The arm 3 and the VCM 4 form an actuator. The actuator is driven by the VCM 4 to controllably move the head 10 mounted on the arm 3 to a designated position. The VCM 4 is controllably driven by a drive current from the driver IC 18. The disk 1 comprises a large number of cylinders (tracks) 100 configured therein and in which data is recorded. The head 10 comprises a slider as a main body and a write head 10W and a read head 10R which are mounted on the slider. The read head 10R reads data recorded in the cylinders 100 on the disk 1. The write head 10W writes data onto the disk 1. The data is servo data and user data as described below. At least two heads 10 are provided to write and read data to and from the respective surfaces of a single disk 1.

The head amplifier IC 11 comprises a read amplifier and a write driver. The read amplifier amplifies a read signal read by the read head 10R and transmits the signal to a read/write (R/W) channel 12. On the other hand, the write driver transmits a write current corresponding to write data output through the R/W channel 12, to the write head 10W.

The HOC 15 comprises an integrated circuit on one chip including the R/W channel 12, an interface controller 13, and a microprocessor (MPU) 14. The R/W channel 12 includes a read channel 12R and a write channel 12W. The read channel 12R processes a read signal to decode data in the signal (including servo data) as described below. The write channel 12W is a write module which carries out signal processing on write data.

The interface controller 13 controls data transfers between a host 19 and the R/W channel 12. The interface controller 13 performs data transfer control by controlling a buffer memory (DRAM) 16 and temporarily storing read data and write data in the buffer memory 16. The interface controller 13 also controls and uses a flash memory 17, for example, as a cache area in which data is temporarily stored.

The MPU 14 is a main controller for the disk drive, and controls the VCM 4 via the driver IC 18 to perform positioning control (servo control) on the head 10. The MPU 14 further controls data recording and reproduction via the R/W channel 12.

[Servo System Configuration]

Figure 2:
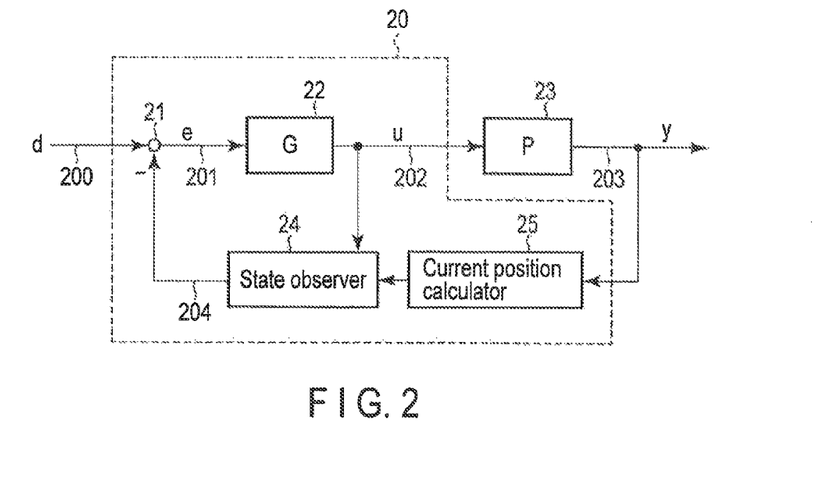
FIG. 2 is a block diagram for explaining the concept of a servo system according to the embodiment.

As shown in FIG. 2, the disk drive according to the present embodiment incorporates a servo system 20 which performs servo control to position the head 10 at a target position on the disk 1. The servo system 20 is implemented not only by the functions of the MPU 14 including software but also by a function of the R/W channel 12 to reproduce servo data and a function of the driver IC 18 to controllably drive the VCM 4.

As shown in FIG. 2, the servo system 20 includes a position error calculator 21, a feedback control system including a feedback controller (transfer function G) 22, a state observer 24, and a current position calculator 25. The position error calculator 21 calculates a position error (e) 201 between a target position (d) 200 of the head 10 and a current position 204 observed by the state observer 24.

The feedback controller 22 is a function implemented by the MPU 14 and controls a plant (transfer function P) 23 so that a control input (u) 202 is output to eliminate the position error (e) 201. The plant 23 is an actuator including the VCM 4 and controllably moves the head 10 to the target position (d) 200.

The state observer 24 comprises an internal model implemented by calculations carried out by the MPU 14. The state observer 24 receives the control input (u) 202 from the feedback controller 22 and current position data calculated by the current position calculator 25, to calculate (estimate) the current position 204 of the head 10. Based on an output (y) 203 from the plant 23, the current position calculator 25 calculates data indicative of the current position or a temporary current position calculated from servo data recorded in a divisional manner as described below.

[Servo Control]

Servo control according to the present embodiment will be described below with reference to FIG. 3 to FIG. 9.

Figure 3:
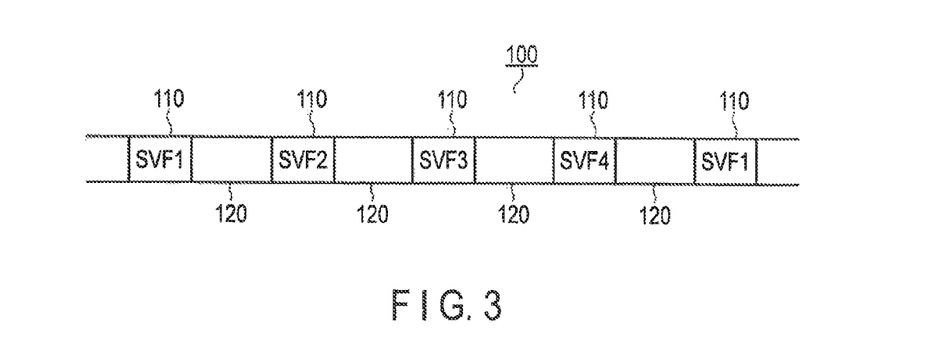
FIG. 3 is a diagram for explaining a configuration of servo areas according to the embodiment.

As shown in FIG. 3, a plurality of servo areas (servo frames) 110 are arranged at regular intervals in each cylinder 100 on the disk 1 according to the present embodiment. Data areas 120 are each provided between the servo areas 110 so that user data can be recorded in each of the data areas 120. According to the present embodiment, the servo data is recorded in four servo areas in a divisional manner. The four divisional servo areas are treated as four types of servo frames SVF1 to SVF4 for convenience.

Figure 4:
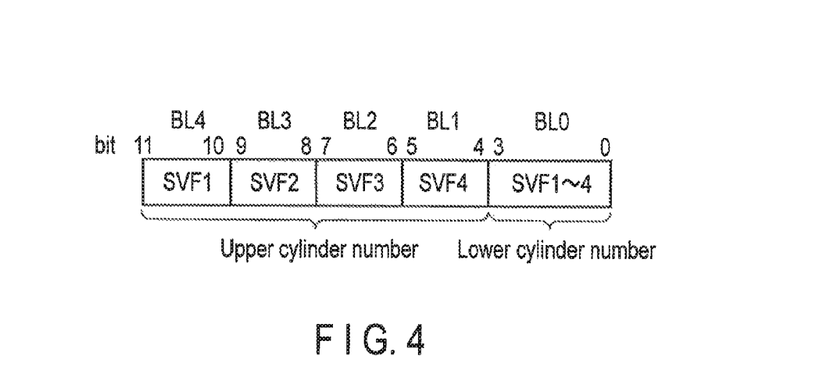
FIG. 4 is a diagram for explaining an example of divided servo data according to the embodiment.

According to the present embodiment, the servo data is recorded in the plurality of servo areas 110 in a divisional manner. Specifically, as shown in FIG. 4, upper bits of a cylinder number which identifies the cylinder 100 are stored in the four servo frames SVF1 to SVF4 in a divisional manner. Lower bits of the cylinder number are stored in each of the four servo frames SVF1 to SVF4.

Here, the cylinder number comprises, for example, a 12-bit cylinder code. The lower cylinder number comprises 4 bits. Furthermore, the upper cylinder number is divided into 2-bit cylinder values BL1 to BL4. The lower cylinder number is a cylinder value BL0 comprising 4 bits.

In the disk drive, the MPU 14 performs servo control to seek and position the head 10 at a target cylinder on the disk 1. The MPU 14 thus writes or reads data to or from the target cylinder. In performing the servo control, the MPU 14 reads the divided upper cylinder number from the four servo frames SVF1 to SVF4 in order to determine the current position (current cylinder) of the head 10. That is, the MPU 14 determines the upper cylinder for the current position by synthesizing the cylinder values BL1 to BL4 loaded during four sampling operations.

Furthermore, when sampling and reading the servo data, the MPU 14 can read the lower cylinder number (cylinder value BL0) from any of the servo frames SVF1 to SVF4 during each sampling operation. Finally, the MPU 14 determines the current position (current cylinder) of the head 10 based on the synthesized upper cylinder number and lower cylinder number.

Figure 5A:
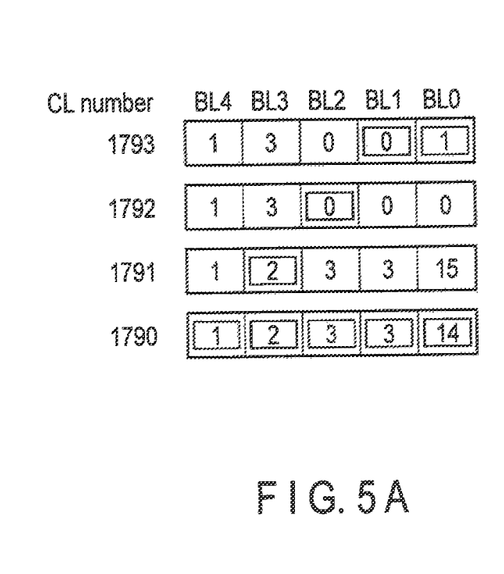
FIGS. 5A and 5B are diagrams for explaining a method for calculating the current position during a seek operation according to the embodiment.
Figure 5B:
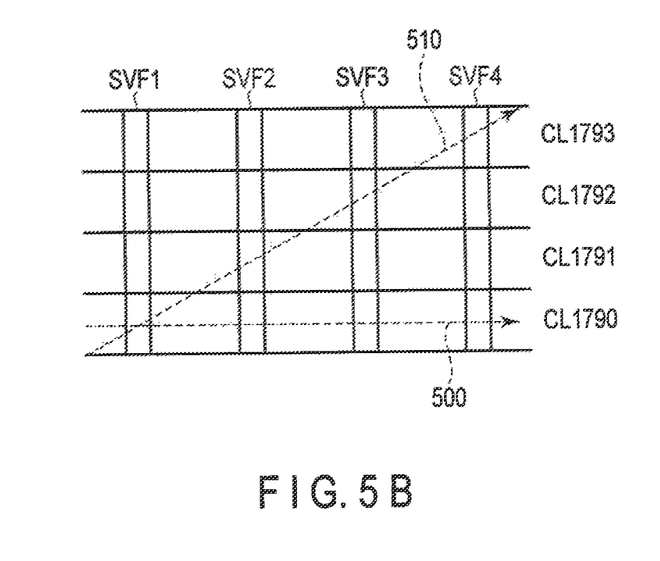

FIGS. 5A and 5B are diagrams for explaining a method for calculating the current position of the head 10 during a seek operation. FIG. 5A is a diagram showing a specific example of the cylinder values BL0 to BL4 recorded in the servo frames SVF1 to SVF4 corresponding to the cylinder number (CL number), FIG. 5B is a diagram for explaining the cylinder number (CL number) read from the servo frames SVF1 to SVF4 by the head 10 during a seek operation.

As shown in FIG. 5B, if the head 10 is held at a position 500 on the disk 1, the MPU 14 acquires the cylinder values BL1 to BL4 (1, 2, 3, 3) of the divided upper cylinder number and the cylinder value BL0 (14) of the lower cylinder number at the point of time of the servo frame SVF4. The MPU 14 can synthesize the acquired cylinder values BL0 to BL4 to determine the CL number 1790 to be the correct current position (current cylinder) of the head 10.

Here, if as shown in FIG. 5B, the head 10 moves from a cylinder with a CL number 1790 to the position 510 of another cylinder on the disk 1, the MPU 14 calculates the current position of the head 10 to be an incorrect CL number 1537 instead of the correct CL number 1793. That is, during sampling operations, the MPU 14 acquires the upper cylinder number (1, 2, 0, 0) from the cylinder values BL4 to BL1 of CL numbers 1790 to 1793 and acquires the lower cylinder number (1) from the cylinder value BL0 of the CL number 1793. Thus, the MPU 14 acquires the CL number 1537, which deviates from the correct CL number 1793 by 256 cylinders.

Thus, according to the present embodiment, the MPU 14 carries out processing of calculating the current position of the head 10 to be the correct CL number, for example, if a seek operation with head switching occurs.

Figure 8:
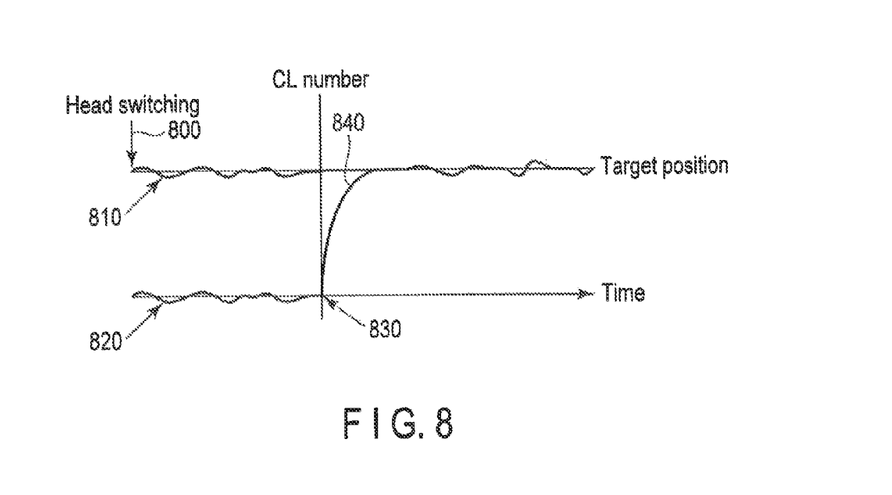
FIG. 8 is a diagram for explaining a seek operation involved with head switching according to the embodiment.

As shown in FIG. 8, in starting a seek operation (810) at the position of a certain CL number at a point of time 800 when head switching occurs, the MPG 14 cannot acquire all the codes of the upper cylinder number and thus cannot determine the current position of the head 10 after head switching. However, the MPG 14 can acquire the lower cylinder number during each sampling operation.

Figure 7A:
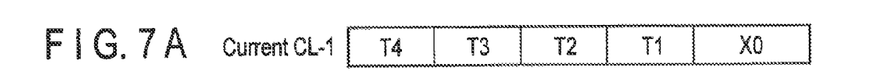
FIGS. 7A and 7B are diagrams for explaining a method for converting the current position during a seek operation according to the embodiment.

Thus, as shown in FIG. 7A, the MPU 14 translates into (assumes) a cylinder number (currently CL-1) by synthesizing the cylinder values (T4 to T1) of the upper cylinder number of the target position (target CL number) during a seek operation and the lower cylinder number (X0) of the current position.

Figure 6A:
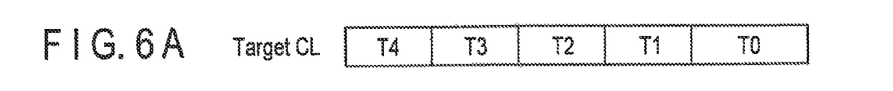
FIGS. 6A and 6B are diagrams for explaining a method for converting the current position during a seek operation according to the embodiment.
Figure 6B:
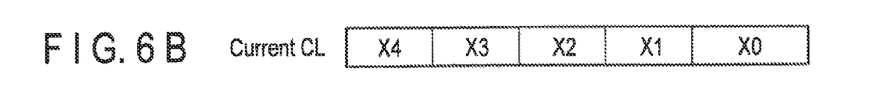

FIG. 6A shows the cylinder number (target CL number) of the target position. Furthermore, FIG. 6B shows the cylinder number (current CL numbers X4 to X0) of the normal current position of the head 10 after head switching. Here, immediately after head switching, if no servo data has been read from any of the servo frames SVF1 to SVF4, the cylinder values (X4 to X0) of the cylinder number are undetermined.

Figure 7B:
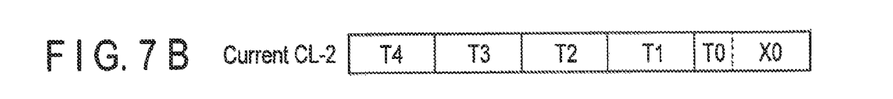

Here, as shown in FIG. 7B, not all the codes of the lower cylinder number of the current position need be used but the cylinder number (currently CL-2) may include a part (for example, the upper bits) of the lower cylinder number (currently CL-2) of the current position. Furthermore, the lower cylinder number may be replaced with a predetermined value.

The MPU 14 performs servo control in which such feedback control as shown in FIG. 2 is carried out based on the translated current position (currently CL-1) to place the head 10 at the target position (target CL number). In this case, the current position (currently CL-1) translated into temporary initial values is set in the state observer 24, which estimates a position and a velocity according to a seek operation. The state observer 24 uses, as a velocity in the temporary initial values, an eccentric velocity calculated from eccentricity used to calculate a position from loaded servo data. Furthermore, the current position of the head 10 is recognized to be in the vicinity of the target position based on the initial values obtained by the translation. This prevents a possible flow of a large current through the VCM 4 and possible significant movement of the head 10 away from the target position.

Here, it is assumed that a position 810 assumed by the MPU 14 (state observer 24) deviates from the actual current position 820 of the head 10 by a number of cylinders as shown in FIG. 8. The MPU 14 calculates a current position 830 at a stage where servo data sufficient to determine the current position is loaded to allow the current position to be determined. That is, the MPU 14 calculates the current position 830 based on an estimated velocity and position data (cylinder number) calculated when servo data is read during a seek operation.

Then, as shown in FIG. 8, the MPU 14 starts a seek operation 840 up to the target position (target CL number) under feedback control using, as initial values for the state observer, the calculated current position 830 and the velocity data estimated by the state observer 24.

A procedure in which the MPU 14 calculates the current position 830 will be described with reference to a flowchart in FIG. 9.

Here, in the example shown in FIG. 5B, the MPU 14 acquires the upper cylinder number divided into the cylinder values BL1 to BL4 and the lower cylinder number of the cylinder value BL0 at the point, of time of the servo frame SVF4. The MPU 14 determines a cylinder number (here, the CL number 1793) obtained by synthesizing the acquired cylinder values BL0 to BL4 to be the correct current position 830 (see FIG. 8). This will be specifically described below.

First, the MPU 14 loads servo data from the servo frame SVFn (n=4) (block 900). Here, the current time is denoted by k, and the MPU 14 initializes a set value i used to set a position into which the servo data is loaded (block 901).

Here, as shown in FIG. 5A, the cylinder value of the lower cylinder number obtained from the servo frame SVF4 at the current time k is denoted by BL0[k]. The cylinder value of the upper cylinder number obtained from the servo frame SVF4 at the current time k is denoted by BL1[k]. Moreover, the velocity estimated by the state observer 24 is denoted by v[k] [cylinder/sample]. In the example shown in FIG. 5B, the velocity v[k] is one cylinder per sample. The MPU 14 loads servo data from the servo frame SVFn in the current sample. The cylinder values are hereinafter simply expressed as BL0 to BL4.

Moreover, the lower cylinder number and the upper cylinder number obtained from the servo frame SVF3 in the last sample are denoted by BL0[k−1] and BL2[k−1], respectively. The lower cylinder number and the upper cylinder number obtained from the servo frame SVF2 in a sample which is two samples older than the current sample are denoted by BL0[k−2] and BL3[k−2], respectively. Additionally, the lower cylinder number and the upper cylinder number obtained from the servo frame SVF1 in a sample which is three samples older than the current sample are denoted by BL0[k−3] and BL4[k−3], respectively.

The MPU 14 uses BL0[k], BL1[k], and the velocity v[k] to estimate BL1[k−1] in the last sample to check for a carry up to or a borrow from BL2[k] obtained from the servo frame SVF3 (NO in block 902, 903).

Here, a "carry up to" or a "borrow from" BL2[k] is checked for depending on whether the upper limit value or lower limit value of BL1 is exceeded between a time k−1 and a time k. In this case, as shown in FIG. 5A, BL1 has an upper limit value of 3 and a lower limit value of 0. Specifically, the MPU 14 determines that a carry up to BL2[k] has occurred if for example, BL1[k−1] is 3 and BL1[k] is 0. Furthermore, the MPU 14 determines that a borrow from BL2[k] has occurred if for example, BL1[k−1] is 0 and BL1[k] is 3. That is, the MPU 14 determines the cylinder value of BL2[k] at the current point of time based on BL2[k−1] in the last sample and a result indicative of a carry up to or a borrow from BL2[k] (block 904).

Then, similarly, the MPU 14 increments the set value i and repeats the processing from block 902 to block 904 (block 905). That is, the MPU 14 uses the determined BL2[k], BL1[k], BL0[k], v[k], and v[k−1] to check for a carry up to or a borrow from BL3[k] obtained from the servo frame SVF2 (block 903). The MPU 14 determines the cylinder value of BL3[k] at the current point of time based on BL3[k−3] in a sample which is two samples older than the current sample and a result indicative of a carry up to or a borrow from BL3[k] (block 904).

Moreover, the MPU 14 uses the determined BL3[k], BL2[k], BL1[k], BL0[k], v[k], v[k−1], and v[k−2] to check for a carry up to or a borrow from BL4[k] (block 903). The MPU 14 determines the cylinder value of BL4[k] at the current point of time based on BL4[k−3] in a sample which is three samples older than the current sample and a result indicative of a carry up to or a borrow from BL[k] (block 904).

A specific example of the above-described procedure of calculation will be described with reference to FIGS. 5A and 5B.

Here, as shown in FIG. 5B, the head 10 moves at a velocity of one cylinder per sample (up to the position 510). As shown in FIG. 5A, the MPU 14 starts loading the upper cylinder number of BL4 (=1) from the servo frame SVF1. The MPU 14 calculates the current position of the head 10 (here, the CL number 1793) at the point of time of loading from the servo frame SVF4.

As described above, during such a seek operation up to the position 510 as shown in FIG. 5B, the MPU 14 synthesizes BL4 (=1), BL3 (=2), BL2 (=0), BL (=0), and BL0 (=1) at the point of time of the servo frame SVF4 to calculate the incorrect CL number 1537.

Figure 9:
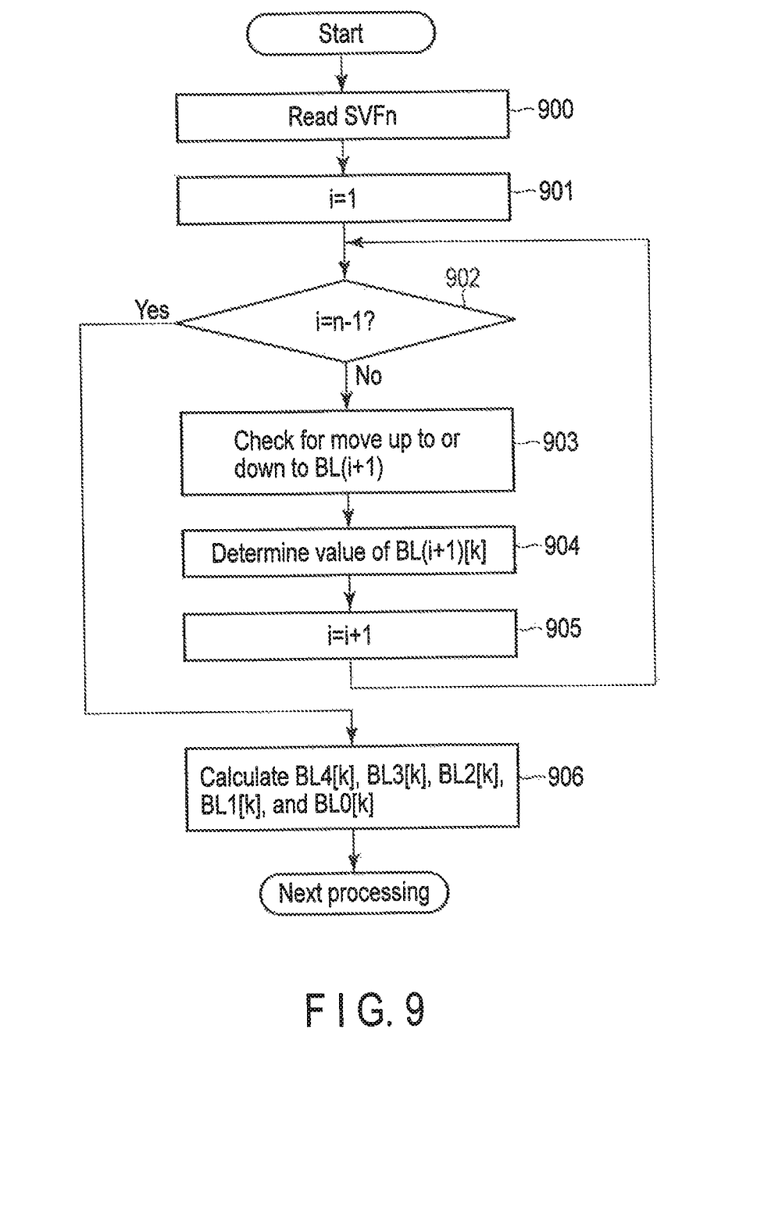
FIG. 9 is a flow chart for explaining a procedure for calculating the current position during a seek operation according to the embodiment.

Thus, according to a procedure for calculation shown in FIG. 9, the MPU 14 synthesizes BL4 (=1), BL3 (=3), BL2 (=0), BL1 (=0), and BL0 (=1) at the point of time of the servo frame SVF4 to calculate the correct CL number 1793.

That is, with the knowledge that the head 10 moves at a velocity of one cylinder per sample, the MPU 14 acquires the upper CL number of BL1 (=0) and the lower CL number of BL0 (=1) from the servo frame SVF4. Based on the cylinder values (BL1 and BL0), the MPU 14 determines that BL2[k] at the current position has not changed from BL2[k−1] obtained from the servo frame SVF3 in the last sample.

Furthermore, based on BL2 (=0) obtained from the servo frame SVF3, the MPU 14 determines, by calculation, that BL3[k] at the current position has a value of 3 as a result of an increase, by 1, in the value (2) of BL3[k−2] in the sample which is two samples older than the current sample. Based on the results of the calculations, the MPU 14 determines that BL4 at the current position has not changed from the value (1) of BL4[k−2] obtained from the servo frame SVF1 in the sample which is two samples older than the current sample. Thus, the MPU 14 synthesizes BL4 (=1), BL3 (=3), BL2 (=0), BL1 (=0), and BL0 (=1) at the position 510 to calculate the correct CL number 1793.

As described above, if a seek operation with head switching is started, the current position can be accurately determined even if the last current position (last current cylinder number) of the head 10 is undetermined. That is, the correct cylinder number, which is the current position of the head 10, can be calculated using the lower cylinder number, a part of the upper cylinder number, and the estimated velocity obtained by a seek operation starting from a temporary current position. In this case, the state observer estimates the position and the velocity using temporary initial values until the current position is determined. After the current position is determined, the initial values for the state observer are set equal to the position data on the current position and the estimated velocity data to allow a seek operation up to the target position to be performed.

Therefore, even if a servo data division method is used which records a plurality of cylinder values into which an upper cylinder number is divided, the present embodiment avoids the need for a substantial amount of seek time or a failure in a seek operation, enabling a reliable seek operation to be achieved. Thus, the application of the present embodiment allows the current position of the head to be accurately detected during a seek operation with head switching and a load operation. Therefore, a disk drive can be provided which enables an increase in recording density and a reliable seek operation.

The present embodiment has been described in conjunction with the case of a seek operation with head switching. However, the present embodiment is not limited to this case but is applicable to the case of a load operation. The load operation is a seek operation of moving the head 10 from a retracted position to a target position on the disk. In the load operation, the MPU 14 performs velocity control in which the VCM 4 is moved at a constant velocity until the servo data is found. Thus, after the servo data is found, the MPU 14 continues the velocity control for a time sufficient to determine the current position of the head 10.

The MPU 14 sets the temporary initial values equal to the cylinder value obtained by loading the servo data during the period of the velocity control as well as a velocity specification for the velocity control so that the state observer 24 can estimate the position and the velocity. The MPU 14 subsequently calculates the current position based on the estimated position and estimated velocity obtained from the state observer 24. The MPU 14 performs a seek operation using, as initial values, the calculated current position and the estimated velocity data provided by the state observer 24.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A disk storage apparatus comprising:
    a disk comprising a plurality of servo areas in which servo data for detecting a radial position is recorded in a divisional manner in the plurality of servo areas;
    a read module configured to read the servo data from the plurality of servo areas using a head; and
    a servo system comprising a state observer, wherein the servo system is configured to:
    perform a seek operation based on initial values including a temporary position, while allowing the state observer to operate based on the initial values, until a current position of the head is determined, if the seek operation up to a target position is performed while the current position of the head is undetermined;
    determine the current position based on the servo data read from the plurality of servo areas by the read module and a result of estimation by the state observer; and
    perform the seek operation up to the target position based on the determined current position, wherein
    the servo data is divided into upper position data and lower position data,
    the lower position data is recorded in each of the plurality of servo areas, and
    the upper position data is recorded in the plurality of servo areas in a divisional manner.

2. The disk storage apparatus of claim 1, wherein the servo system is configured to
    set the temporary position used until the current position is determined, using the upper position data for identifying the target position and the lower position data capable of being acquired at the current position, and to
    allow a seek operation to be performed using, as the initial values, the set temporary position and an initially set estimated velocity at which the head is moved.

3. The disk storage apparatus of claim 1, wherein the servo system is configured to
    read servo data required to calculate the current position, from the plurality of servo areas, during execution of the seek operation based on the initial values including the temporary position until the current position is determined, and to
    determine the current position based on the servo data and a velocity estimated by the state observer.

4. The disk storage apparatus of claim 1, wherein the servo system is configured to
    read the lower and upper position data required to calculate the current position, from the plurality of servo areas, during execution of the seek operation based on the initial values including the temporary position until the current position is determined, and to
    determine the current position based on servo data obtained by synthesizing the upper and lower position data and a velocity estimated by the state observer.

5. The disk storage apparatus of claim 1, further comprising:
    a plurality of heads configured to write and read data to and from the disk, wherein
    if a seek operation with head switching is performed as the seek operation carried out up to the target position while the current position of the head is undetermined, the servo system performs the seek operation based on the initial values including the temporary position, while allowing the state observer to operate based on the initial values, until the current position is determined.

6. The disk storage apparatus of claim 1, wherein
if a load operation moving the head from a retract position to a target position on the disk is performed as the seek operation carried out up to the target position while the current position of the head is undetermined, the servo system performs the seek operation based on the initial values including the temporary position, while allowing the state observer to operate based on the initial values, until the current position is determined.

7. The disk storage apparatus of claim 1, wherein
the position data includes cylinder data for detecting of a cylinder, which is a position on the disk in a radial direction.

8. A method of servo controlling in a disk storage apparatus comprising a disk comprising a plurality of servo areas in which servo data for detecting a radial position is recorded in a divisional manner in the plurality of servo areas, the method comprising:
reading the servo data from the plurality of servo areas using a head;
performing a seek operation based on initial values including a temporary position, while allowing a state observer to operate based on the initial values, until a current position of the head is determined, if the seek operation up to a target position is performed while the current position of the head is undetermined,
determining the current position based on the servo data read from the plurality of servo areas and a result of estimation by the state observer; and
performing the seek operation up to the target position based on the determined current position, wherein
the servo data is divided into upper position data and lower position data,
the lower position data is recorded in each of the plurality of servo areas, and
the upper position data is recorded in the plurality of servo areas in a divisional manner.

9. The method of claim 8, further comprising:
setting the temporary position used until the current position is determined, using the upper position data for identifying the target position and the lower position data capable of being acquired at a current position; and
performing the seek operation using, as the initial values, the set temporary position and an initially set estimated velocity at which the head is moved.

10. The method of claim 8, further comprising:
reading servo data required to calculate the current position, from the plurality of servo areas, during execution of the seek operation based on the initial values including the temporary position until the current position is determined; and
determining the current position based on the servo data and a velocity estimated by the state observer.

11. The method of claim 8, further comprising:
reading the lower and upper position data required to calculate the current position, from the plurality of servo areas, during execution of the seek operation based on the initial values including the temporary position until the current position is determined; and
determining the current position based on servo data obtained by synthesizing the upper and lower position data and a velocity estimated by the state observer.

12. The method of claim 8, wherein the disk storage apparatus comprises a plurality of heads configured to write and read data to and from the disk, further comprising:
if a seek operation with head switching is performed as the seek operation carried out up to the target position while the current position of the head is undetermined, performing the seek operation based on the initial values including the temporary position, while allowing the state observer to operate based on the initial values, until the current position is determined.

13. The method of claim 8, further comprising:
if a load operation moving the head from a retract position to a target position on the disk is performed as the seek operation carried out up to the target position while the current position of the head is undetermined, performing the seek operation based on the initial values including the temporary position, while allowing the state observer to operate based on the initial values, until the current position is determined.

14. The method of claim 8, wherein
the position data includes cylinder data for detecting of a cylinder, which is a position on the disk in a radial direction.

\* \* \* \* \*